(12) United States Patent
White

(10) Patent No.: US 10,803,441 B1
(45) Date of Patent: Oct. 13, 2020

(54) SYSTEMS AND METHODS FOR SECURE WIRELESS PAYMENT TRANSACTIONS WHEN A WIRELESS NETWORK IS UNAVAILABLE

(71) Applicant: Cria, Inc., Wilmington, DE (US)

(72) Inventor: William O. White, Kirkland, WA (US)

(73) Assignee: CRIA INC., Wilmington, DE (US)

( * ) Notice: Subject to any disclaimer, the term of this patent is extended or adjusted under 35 U.S.C. 154(b) by 0 days.

(21) Appl. No.: 15/667,471

(22) Filed: Aug. 2, 2017

Related U.S. Application Data

(63) Continuation of application No. 15/599,327, filed on May 18, 2017, now Pat. No. 10,467,618, which is a continuation of application No. 14/257,437, filed on Apr. 21, 2014, now Pat. No. 9,684,896, which is a continuation of application No. 13/417,868, filed on Mar. 12, 2012, now Pat. No. 8,744,974.

(60) Provisional application No. 61/452,102, filed on Mar. 12, 2011.

(51) Int. Cl.
*G06Q 20/32* (2012.01)
*G06Q 20/38* (2012.01)

(52) U.S. Cl.
CPC ....... *G06Q 20/3226* (2013.01); *G06Q 20/382* (2013.01); *G06Q 20/325* (2013.01); *G06Q 20/3278* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 8,332,323 B2 | 12/2012 | Stals et al. | |
| 8,403,211 B2 | 3/2013 | Brooks et al. | |
| 8,447,669 B2 | 5/2013 | Antoo et al. | |
| 8,500,008 B2 | 8/2013 | Masaryk et al. | |
| 8,538,863 B1 | 9/2013 | Saunders | |
| 2001/0047479 A1* | 11/2001 | Bromba | G07C 9/00158 713/186 |
| 2002/0161666 A1* | 10/2002 | Fraki | G06Q 30/0267 705/14.64 |
| 2003/0222138 A1* | 12/2003 | Oppenlander | G06Q 20/10 235/380 |
| 2003/0228866 A1* | 12/2003 | Pezeshki | H04W 8/245 455/422.1 |
| 2004/0240671 A1* | 12/2004 | Hu | H04W 12/04 380/277 |

(Continued)

OTHER PUBLICATIONS

Smith (Non-Patent Publication), "From Metal Coins to Venmo: A History of Americ's Credit Cards" (Year: 2015).*

(Continued)

*Primary Examiner* — Jay Huang
*Assistant Examiner* — Gabriel Mercado
(74) *Attorney, Agent, or Firm* — Womble Bond Dickinson (US) LLP

(57) ABSTRACT

Systems, methods, and devices are disclosed which allow a mobile device user to complete financial transactions even when the mobile device is not connected to a wireless network. The systems, methods, and devices of the present disclosure may utilize a combination of an encrypted lockbox containing out of network payment codes on the mobile device and a matching set of out of network payment codes stored on a server of a payment authority.

12 Claims, 13 Drawing Sheets

(56) References Cited

U.S. PATENT DOCUMENTS

| | | | |
|---|---|---|---|
| 2005/0138388 A1* | 6/2005 | Paganetti | H04L 63/0823 713/185 |
| 2005/0246534 A1* | 11/2005 | Kirkup | H04L 51/38 713/170 |
| 2006/0223530 A1* | 10/2006 | Bumiller | H04L 29/12122 455/435.1 |
| 2006/0224901 A1* | 10/2006 | Lowe | H04L 63/062 713/186 |
| 2007/0143824 A1* | 6/2007 | Shahbazi | H04L 63/083 726/1 |
| 2007/0175978 A1 | 8/2007 | Stambaugh | |
| 2007/0192255 A1* | 8/2007 | Ohmori | G06Q 20/10 705/52 |
| 2007/0219923 A1 | 9/2007 | Shea et al. | |
| 2007/0266130 A1* | 11/2007 | Mazur | G06Q 20/12 709/223 |
| 2007/0297610 A1* | 12/2007 | Chen | H04L 9/0822 380/270 |
| 2008/0082452 A1 | 4/2008 | Wankmueller et al. | |
| 2008/0203151 A1 | 8/2008 | Dixon et al. | |
| 2009/0177717 A1* | 7/2009 | Meehan | H04L 63/0823 |
| 2010/0088231 A1 | 4/2010 | Eugenio | |
| 2011/0087602 A1* | 4/2011 | Rutman | G06Q 20/1235 705/52 |
| 2011/0099079 A1 | 4/2011 | White | |
| 2012/0109826 A1 | 5/2012 | Kobres | |
| 2012/0173431 A1* | 7/2012 | Ritchie | G06Q 20/367 705/65 |
| 2012/0233005 A1 | 9/2012 | White | |
| 2013/0040626 A1 | 2/2013 | Morgaine | |
| 2013/0179352 A1 | 7/2013 | Dwyre et al. | |
| 2014/0229304 A1 | 8/2014 | White | |

OTHER PUBLICATIONS

Smith—from-metal-coins-to-venmo (Year: 2015).*
Smith, "From Metal Coins to Vennno . . . ", 2015 (Year: 2015).*

* cited by examiner

SYSTEMS AND METHODS FOR SECURE WIRELESS PAYMENT TRANSACTIONS WHEN A WIRELESS NETWORK IS UNAVAILABLE

CROSS REFERENCE TO RELATED APPLICATIONS

The present application is a continuation of U.S. patent application Ser. No. 15/599,327, filed on May 18, 2017, which is a continuation of U.S. patent application Ser. No. 14/257,437, filed on Apr. 21, 2014, which is a continuation of U.S. patent application Ser. No. 13/417,868, entitled "SYSTEMS AND METHODS FOR SECURE WIRELESS PAYMENT TRANSACTIONS WHEN A WIRELESS NETWORK IS UNAVAILABLE," filed Mar. 12, 2012, which claims priority to U.S. Provisional Patent Application Ser. No. 61/452,102, entitled "SYSTEMS AND METHODS FOR SECURE WIRELESS PAYMENT TRANSACTIONS WHEN A WIRELESS NETWORK IS UNAVAILABLE," filed on Mar. 12, 2011. The entire contents of each of these applications are incorporated herein by reference.

BACKGROUND

The present invention relates generally to electronic commerce. More specifically, but not by way of limitation, the present invention relates to systems and methods for conducting wireless payment transactions when a wireless network is unavailable.

Cell coverage is not ubiquitous and cannot be guaranteed to be available in all locations. However, some types of mobile device payment systems may connect to services over cellular or other wireless networks to authorize and settle transactions with merchants. Thus, the unavailability of a cellular or wireless network can result in a failure to complete the financial transaction. A mobile device user cannot always accurately predict whether a wireless network will be available when the user is choosing to patronize a particular merchant.

Accordingly, there may be a need to provide an out-of-network option to allow mobile device users to use their mobile devices as payment devices even when a wireless network is unavailable.

SUMMARY

Illustrative embodiments of the present invention are shown in the drawings and are summarized below. These and other embodiments are more fully described in the Detailed Description section. It is to be understood, though, that there is no intention to limit the invention to the forms described in this Summary or in the Detailed Description.

Systems, methods, and devices are disclosed which allow a mobile device user to complete financial transactions even when the mobile device is not connected to a wireless network. The systems, methods, and devices of the present disclosure may utilizing a combination of an encrypted lockbox containing out of network payment codes on the mobile device and a matching set of out of network payment codes stored on a server of a payment authority.

In a first set of embodiments, a method for authorizing a transaction includes: receiving at a payment authority server system, from a point of sale terminal, a request to authorize the transaction using a payment code provided to the point of sale terminal via a mobile device, the payment code associated with a state of disconnection between the mobile device and a wireless network; determining that the received payment code matches a payment code contained within at least one set of stored payment codes at the payment authority server system; authorizing the transaction to the point of sale terminal based on the determination; marking the received payment code as used in the at least one set of stored payment codes at the payment authority server system; and transmitting a replacement payment code to the mobile device in response to the mobile device connecting to a wireless network.

In a second set of embodiments, a payment authority server system includes at least one processor and at least one memory communicatively coupled with the at least one processor. The at least one memory stores executable code that, when executed by the at least one processor, causes the at least one processor to: receive from a point of sale terminal a request to authorize a transaction using a payment code provided to the point of sale terminal via a mobile device, the payment code associated with a state of disconnection between the mobile device and a wireless network; determine that the received payment code matches a payment code contained within at least one set of stored payment codes; authorize the transaction to the point of sale terminal based on the determination; mark the received payment code as used in the at least one set of stored payment codes at the payment authority server system; and transmit a replacement payment code to the mobile device in response to the mobile device connecting to a wireless network.

In a third set of embodiments, a method for conducting a transaction includes: receiving a request from a user for a payment code at a mobile device; determining that a wireless network is unavailable to the mobile device; retrieving a payment code from a digital lockbox of the mobile device in response to the determination that the wireless network is unavailable, the payment code associated with a state of disconnection between the mobile device and a wireless network; providing the retrieved payment code to a point of sale terminal to authorize the transaction; and communicating with a payment authority server to receive a replacement payment code for the digital lockbox in response to the mobile device reconnecting to the wireless network.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the systems, methods, and devices of the present application, a set of out-of-network payment codes may be stored both at an encrypted lockbox of a mobile device and a payment authority server. When a user of the mobile device chooses to conduct a transaction and the mobile device is out of range of a cellular or other wireless network, the mobile device may retrieve an out-of-network payment code for use in authorizing the transaction. The payment authority may receive the out-of-network payment code from a merchant point-of-sale terminal, authorize the transaction based on the out-of-network payment code, and render that particular out-of-network payment code invalid as the transaction is completed. When the mobile device reconnects to the wireless network, the mobile device may receive one or more replacement out-of-network payment codes for storage in the lockbox.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

As used in the present disclosure and appended claims, the term "merchant" is to be broadly construed as a provider of goods and services. In the following discussion, a merchant may be sometimes referred to as "the first user."

A mobile-payment-card platform in accordance with these illustrative embodiments provides, among other things, a server-side digital wallet and a mobile device-side wallet for mobile payment cards that overcomes the shortcomings (e.g., risk of loss or theft) associated with other payment methods that reside within the mobile device itself. In these illustrative embodiments, no credentials (account numbers, balances, or other sensitive information) associated with the user's payment methods, i.e., cards, reside in the mobile device itself. Instead, a secure network infrastructure distributes and manages the payment methods and their associated credentials, the mobile device acting merely as one means for the user to communicate with the server-side digital wallet and the merchant point-of-sale to access a variety of flexible services surrounding use of the mobile payment methods.

Figure 1:
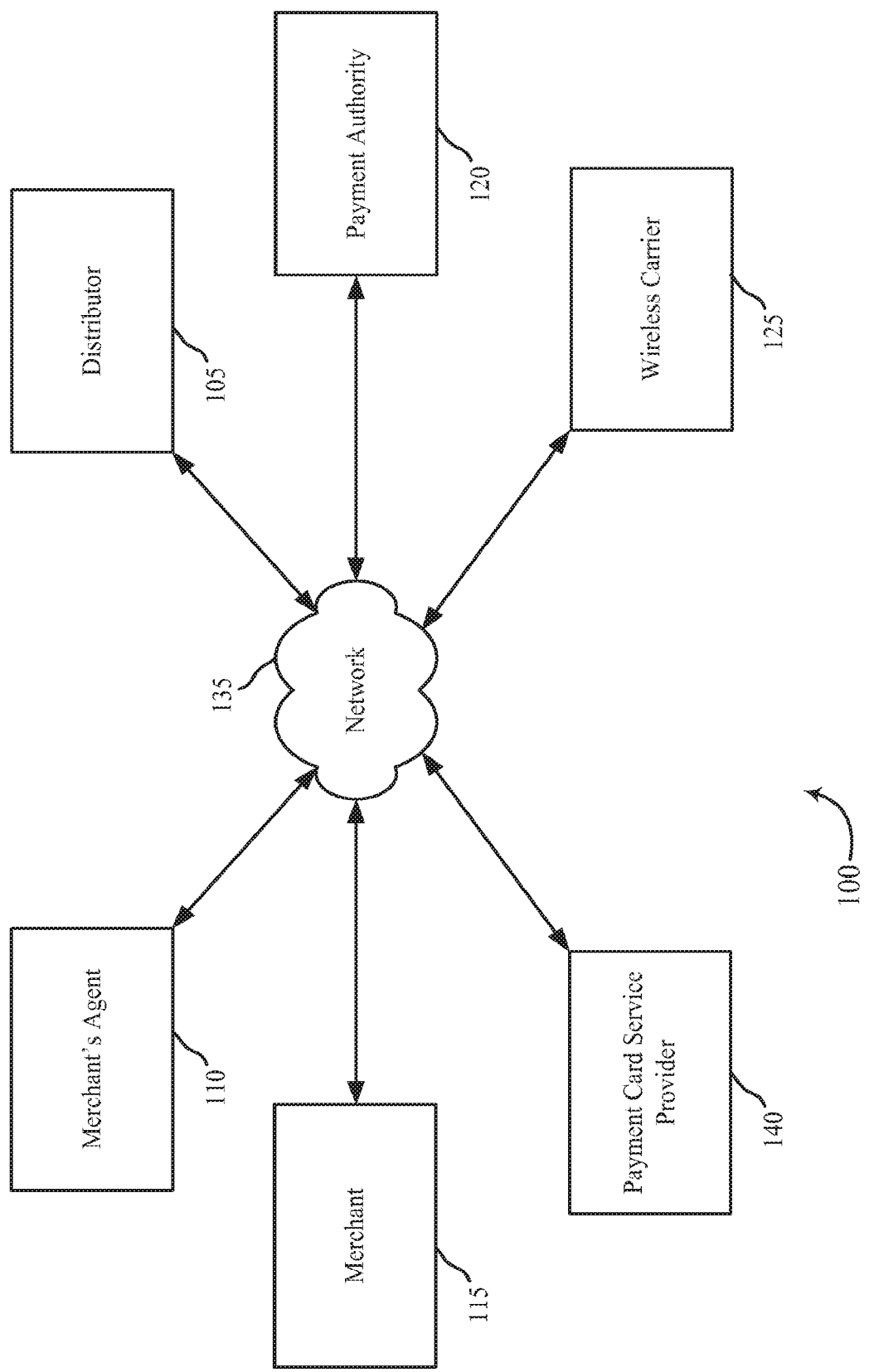
FIG. 1 is a block diagram of an example system including components configured according to various embodiments of the invention.

FIG. 1 illustrates a functional block diagram of a system 100 in which various illustrative embodiments of the invention can be implemented. In system 100, distributor 105, merchant's agent 110, merchant 115, payment authority 120, wireless carrier 125, and payment-card service provider 140 are able to communicate with one another via network 135. A user's mobile device—e.g., a cellular or Personal Communication Service (PCS) phone—is also able to communicate with nodes connected with network 135 via wireless carrier 125. In some embodiments, network 135 includes, but is not necessarily limited to, the Internet.

It will be understood that the wireless network utilized by the mobile device referred to herein can be a cellular communication network such as a GSM network, a COMA network, a 3G network, a 4G network, WiFi, WiMAX, etc. Further, it will be understood that the mobile device can communicate with the payment card management platform via the Internet or the World Wide Web. Also, the mobile device can connect to the payment card management platform via one or more wired or wireless Metropolitan Area networks (MANs); one or more wired or wireless local area networks (LANs); one or more wired or wireless Wide Area networks (WANs); one or more wired or wireless Personal Area networks (PANs); etc. Further, it will be understood that the various components are configured to communicate using the requisite communication protocols and signal schemes.

The system 100 in FIG. 1 may build on existing payment systems operated by payment service providers 140 such as, without limitation, MOCAPAY, FIRST DATA and COMDATA.

Payment service provider 140, among other things, administers the financial aspects of payment cards, including keeping track of the balance associated with a particular payment method, settlement, reporting to merchants, and other functions.

Merchant 115 sells goods, services, or both to consumers either directly or with the assistance of merchant's agent 110. That is, merchant's agent 110 may facilitate the distribution and sale of payment cards issued by merchant 115 by acting as an intermediary between merchant 115 and any of the following: (1) a payment-card service provider 140, (2) mobile-payment-card distributors 105, (3) mobile-payment-card purchasers (those giving the mobile payment cards to others), and (4) mobile-payment-card recipients (consumers who use the mobile payment cards in commerce). A consumer holding such a mobile payment card can use the mobile device to purchase goods or services from the particular merchant that issued the mobile payment card, as explained above. How the holder of a mobile payment card uses the mobile device to make purchases from the issuing merchant is discussed further below. As should be understood from one skilled in the art, the use of the mobile device described herein is not limited to the strict use of a payment card but can include the use of loyalty cards, coupons, gift cards, or other incentives.

Payment authority 120 processes the source of funds for transactions carried out from a user's mobile device such as the user's reloading of a mobile payment card or purchase of a mobile payment card on behalf of someone else. In such transactions, payment authority 120 acts as an agent of the merchant to collect funds from the user's credit card or other payment source. In some examples, an entity acting as a payment authority 120 in certain contexts may also be a distributor 105 in other contexts.

Distributor 105 markets mobile payment cards and, in some embodiments, is somewhat analogous to an entity such as a grocery store chain which markets conventional plastic, magnetically encoded payment cards for a variety of other merchants on racks in its grocery stores with the assistance of a conventional-payment-card merchant's agent. Distributor 105 can take on a variety of different forms, depending on the particular embodiment.

In one example, distributor 105 may be an entity (not necessarily a merchant) that operates a Web site or other electronic communication channel where payment cards for a number of different merchants are offered in an aggregated fashion. In another embodiment, a single merchant markets its payment cards via remote distribution channels, local distribution channels, or both. For example, a merchant may market its payment cards via a remote distribution channel such as a Web site or other networked electronic communication channel using Application Programming Interfaces (APIs) supplied by merchant's agent 110 or another entity. That is, a merchant may use flexible APIs provided by merchant's agent 110 to customize a Web site or other networked electronic communication channel to offer its payment cards in a manner consistent with the merchant's particular brand identify, logos, etc. A merchant may also employ local distribution methods in a store (at the point of sale). In such examples, the payment card can be "mobilized" (made accessible to the recipient via the recipient's mobile device) at the point of sale.

In yet another embodiment, distributor 105 may be a social networking Web site where the interests and preferences of a potential mobile-payment-card recipient are revealed to that person's friends and family. For example, John may discover on a social networking web site that his friend Alan likes to shop at a particular merchant, and John can purchase a mobile payment card for that merchant at the social networking site for Alan. The above are merely a few examples of distributors 105. Mobile payment cards can be marketed in a wide variety of ways and settings.

In an illustrative embodiment, merchant 115 receives the funds from a user's purchase of a mobile payment card minus a predetermined fee that is paid to the merchant's agent 110.

Figure 2:
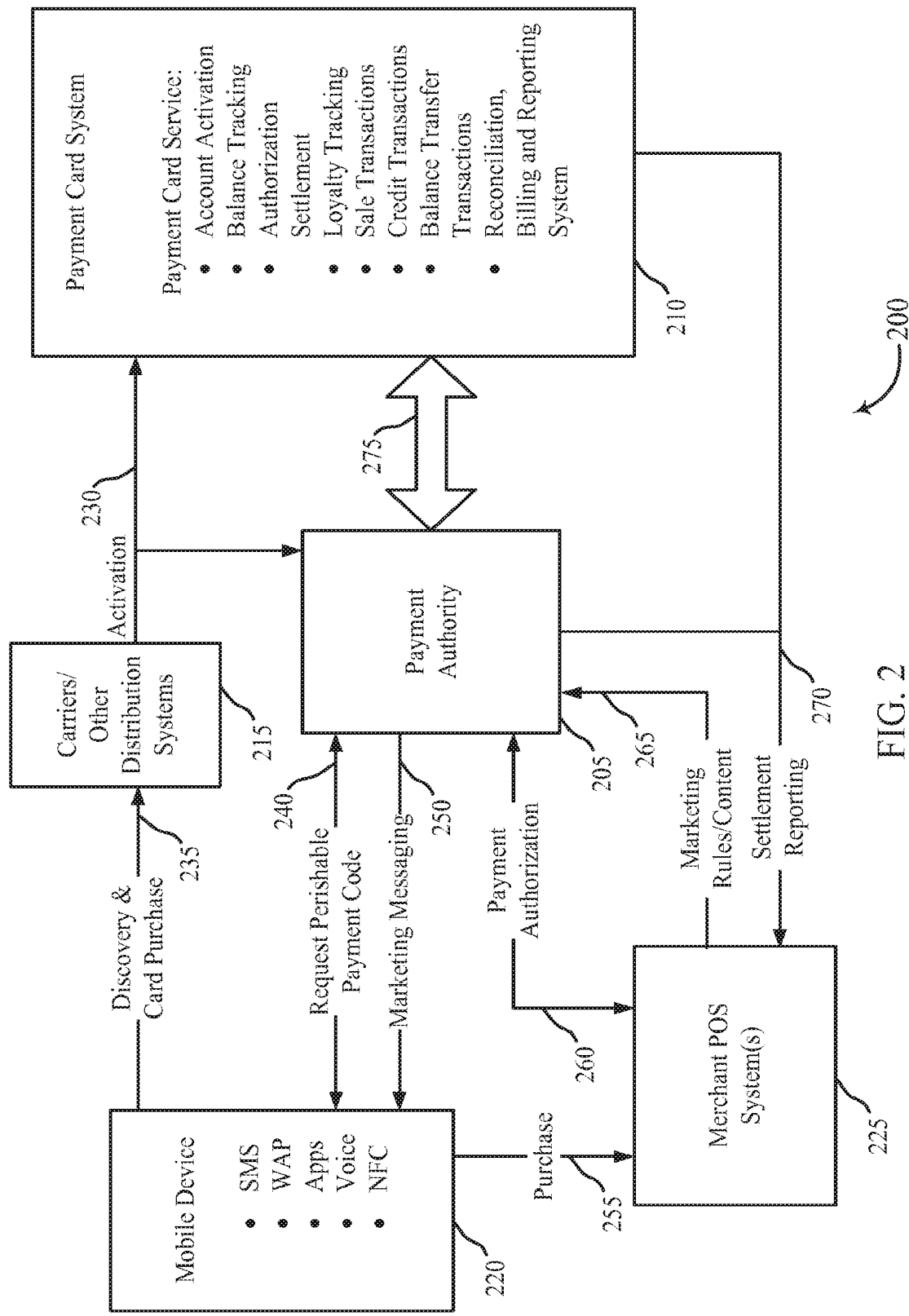
FIG. 2 is a diagram showing example interactions among various entities involved in the implementation of the use of out of network payment codes, according to various embodiments of the invention.

FIG. 2 is a diagram showing interactions among various entities involved in the distribution and use of mobile payment cards in a system 200, in accordance with an illustrative embodiment of the invention. In FIG. 2, payment card system 210 represents a system operated by a conventional payment-card service provider 140 such as, without limitation, FIRST DATA or COMDATA. Various embodiments of the invention preserve the existing payments infrastructure supporting the use of payment cards and overlay them with a payment authority 205, which is explained below. Other entities involved are a merchant point of sale system 225, a mobile device 220, and carriers or other entities ("CARRIERS/OTHERS" in FIG. 2) 215 and their associated distribution systems (see distributor 105 in FIG. 1). In the discussion of FIG. 2 below, interactions among these entities are identified by their corresponding reference numerals in parentheses.

In some embodiments, mobile device 220 can use a variety of different access methods such as, without limitation, Short Message Service (SMS) messages, Multimedia Message Service (MMS) messages, Wireless Access Protocol (WAP), an application, or voice to obtain perishable authorization codes 240 from payment authority 205 in making payments from a variety of different tenders (forms of payment), including mobile payment cards. Mobile device 220 can also use a variety of methods, including Near Field Communications (NFC) and any of the above examples, to provide one-use perishable authorization codes to merchant point of sale systems 225 in making electronic purchases 260.

For example, mobile device 220 may receive a perishable authorization code 240 for use with a specific transaction. Mobile device 220 may provide the perishable authorization code 240 to a merchant point-of-sale (POS) system 225 to pay for a transaction via NFC communications or another method, and the merchant POS system 225 may receive payment authorization from the payment authority based on the perishable authorization code. Additional details and examples regarding the use of perishable authorization codes 240 can be found, for example, in the aforementioned '489 patent.

A user of mobile device 220 may also receive targeted marketing messages 250 before, during, or after a mobile purchase via payment authority 205 and may purchase 235 mobile payment cards from a carrier 215 or other distributor 105 such as a social networking Web site. The targeted marketing messages are assisted by the ability of merchant point of sale system 225 to submit marketing rules, content, or both 265 to payment authority 205.

Payment authority 205 may be an example of payment authority 205 described above with reference to FIG. 1. Payment authority 205 may facilitate the activation 230 of mobile payment cards sold by a carrier or other entity 215 (or other distributor 105) in cooperation with payment card system 210 via communication link 275. Payment card system 210 may also provide, among other things, settlement and reporting services 270 to the merchant.

When the user of mobile device 220 makes a purchase using a mobile payment card, mobile device 220 contacts payment authority 205 using any of a variety of access methods (e.g., SMS, MMS, WAP, HTTP, or other browser technology, application, voice) to provide an optional personal identification number (PIN) by which payment authority 205 authenticates mobile device 220. Payment authority 205 provides mobile device 220 with one-time perishable (time-limited) authorization codes 240 and balances for various tenders available to that user, including mobile payment cards. In the present example, the user of mobile device 220 selects a specific mobile payment card to be used in making the purchase. The mobile-payments-enabled merchant point of sale system 225 submits 255 the authorization code provided by mobile device 220 and the transaction amount to payment authority 205. Payment authority 205 routes the transaction parameters to payment card system 210, which ensures that the requested amount is available on the indicated mobile payment card. If everything checks out, payment card system 210 informs payment authority 205, which, in turn, conveys a return authorization to the merchant point of sale system 225, completing the transaction.

With this high-level background in place, the remainder of this Detailed Description focuses primarily on the use of mobile payment cards when a wireless network is unavailable.

Figure 3:
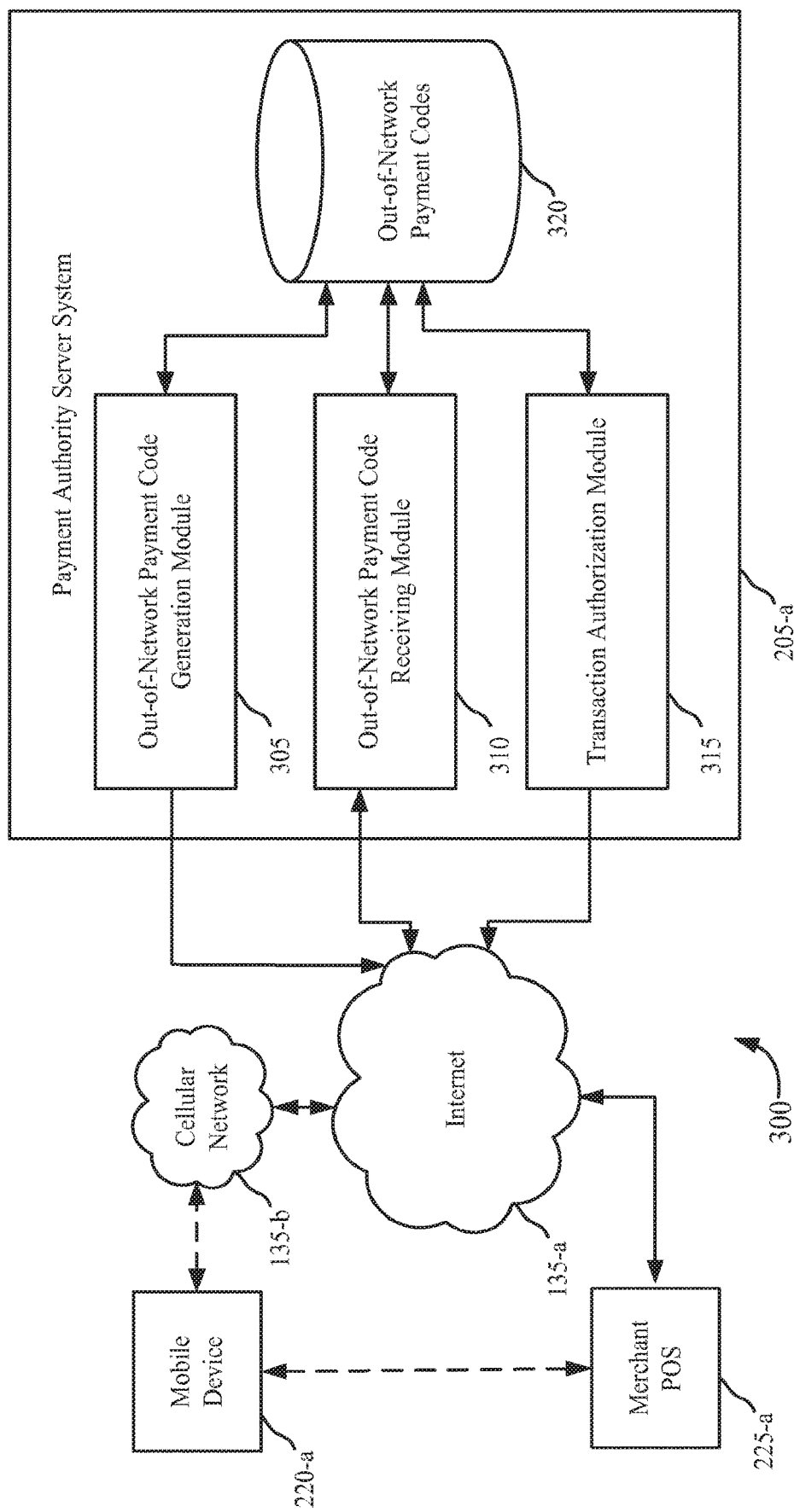
FIG. 3 is a diagram of an example system including components configured according to various embodiments of the invention.

FIG. 3 is a block diagram of an illustrative system 300 for conducting a transaction. System 300 may be an example of the system 100 or system 200 described above with respect to FIG. 1 or FIG. 2. System 300 includes a payment authority server system 205-*a*, the Internet 135-*a*, cellular network 135-*b*, mobile device 220-*a*, and merchant point-of-sale (POS) terminal 225-*a*. Each of these elements may be in communication, directly or indirectly. Payment authority server system 205-*a* may be an example of payment authority 120 described above with reference to FIG. 1 or payment authority server 205 described above with reference to FIG. 2. The Internet 135-*a* and cellular network 135-*b* may be examples of network 135 described above with reference to FIG. 1. Mobile device 220-*a* may be an example of the mobile device 220 described above with respect to FIG. 2. Merchant POS terminal 225-*a* may be a component of the merchant POS system(s) 225 described above with reference to FIG. 2.

In the example of FIG. 3, payment authority server system 205-*a* includes an out-of-network payment code generation module 305, an out-of-network payment code receiving module 310, a transaction authorization module 315, and a data store 320 of out-of-network payment codes. Each of these components may be in communication, directly or indirectly. Each of the respective modules 305, 310, 315, 320 in payment authority server system 205-*a* may be implemented by hardware, software, or a combination of hardware and software. In certain examples, a single hardware device may implement the functionality of one or more modules 305, 310, 315, 320. Additionally or alternatively, the functionality of one or more modules 305, 310, 315, 320 may be implemented by a distributed across a number of autonomous devices.

In the present example, the out-of-network payment code generation module 305 generates a number of out-of-network payment codes for a user of mobile device 220-*a*. These out-of-network payment codes may be transmitted to mobile device 220-*a* over the Internet 135-*a* and cellular network 135-*b*. Mobile device 220-*a* may receive the out-of-network payment codes and store them in an encrypted lockbox. A corresponding set of matching out-of-network payment codes may be associated with the user of the mobile device 220-*a* and stored in data store 320.

While mobile device 220-*a* is connected to cellular network 135-*b* and the user of mobile device 220-*a* wishes to conduct a transaction, mobile device 220-*a* may request and receive dynamically generated perishable payment codes. These perishable payment codes may be associated with specific transactions, and provided to merchant POS 225-*a*, which routes the perishable payment codes to payment authority 205-*a* over the Internet 135-*a* for authorization.

However, if mobile device 220-*a* is disconnected from cellular network 135-*b* (e.g., out of range), the user of mobile device 220-*a* may still conduct transactions with merchant POS terminals using the generated out-of-network payment codes stored in the encrypted lockbox of mobile device 220-*a*. When the user of mobile device 220-*a* desires to conduct a transaction and mobile device 220-*a* determines that mobile device 220-*a* is disconnected from cellular network 135-*b*, mobile device 220-*a* may prompt the user to authorize use of one of the out-of-network payment codes. If authorization is given, mobile device 220-*a* may provide the out-of-network payment code to the merchant POS terminals 225-*a* via NFC, the display of the mobile device 220-*a*, or any other means. The merchant POS 225-*a* may then route the received out-of-network payment code over the internet 135-*a* to payment authority server system 205-*a*, which receives the out-of-network payment code at out-of-network payment code receiving module 310.

Transaction authorization module 315 may determine that the received out-of-network payment code matches one of the payment codes stored in data store 320 (e.g., by comparing the payment code to each of the payment codes stored in data store 320 to identify an identical match) and authorize the transaction based on the match. The transaction authorization module 315 may also mark the received out-of-network payment code used in the data store 320, and render the used code unusable for a predetermined period of time. If payment authority server system 205-*a* receives the same out-of-network payment code after it has been rendered unusable, or if the payment authority server system 205-*a* determines that a received out-of-network payment code does not match any of the out-of-network payment codes of data store 320, the transaction may be rejected.

In certain examples, the out-of-network payment code may generate out-of-network payment codes having two components: a first component provided by payment authority server system 205-*a*, and a second component known to the user of mobile device 220-*a*. In these examples, only the first component of each out-of-network payment code may be provided to mobile device 220-*a*, and the user will be expected to complete the out-of-network payment code as an added measure of security. In certain examples, the length of the out-of-network payment codes provided to mobile device 220-*a* may be variable.

In certain examples, the out-of-network payment codes provided to and stored by mobile device 220-*a* may have limited periods of validity. Thus, while mobile device 220-*a* is connected to cellular network 135-*b*, the out-of-network payment codes may be changed and updated as periods of validity expire. However, depending on the location of the user, it may be beneficial to adjust the period of validity for one or more of the out-of-network payment codes based on a location of the mobile device. For example, if payment authority server system 205-*a* detects that mobile device 220-*a* is near an area of low reception where a risk of disconnecting from the cellular network 135-*b* is likely, the period of validity for one or more of the stored out-of-network payment codes provided to mobile device 220-*a* may be extended. Additionally or alternatively, mobile device 220-*a* may store one or more out-of-network payment codes that are valid indefinitely.

Figure 4:
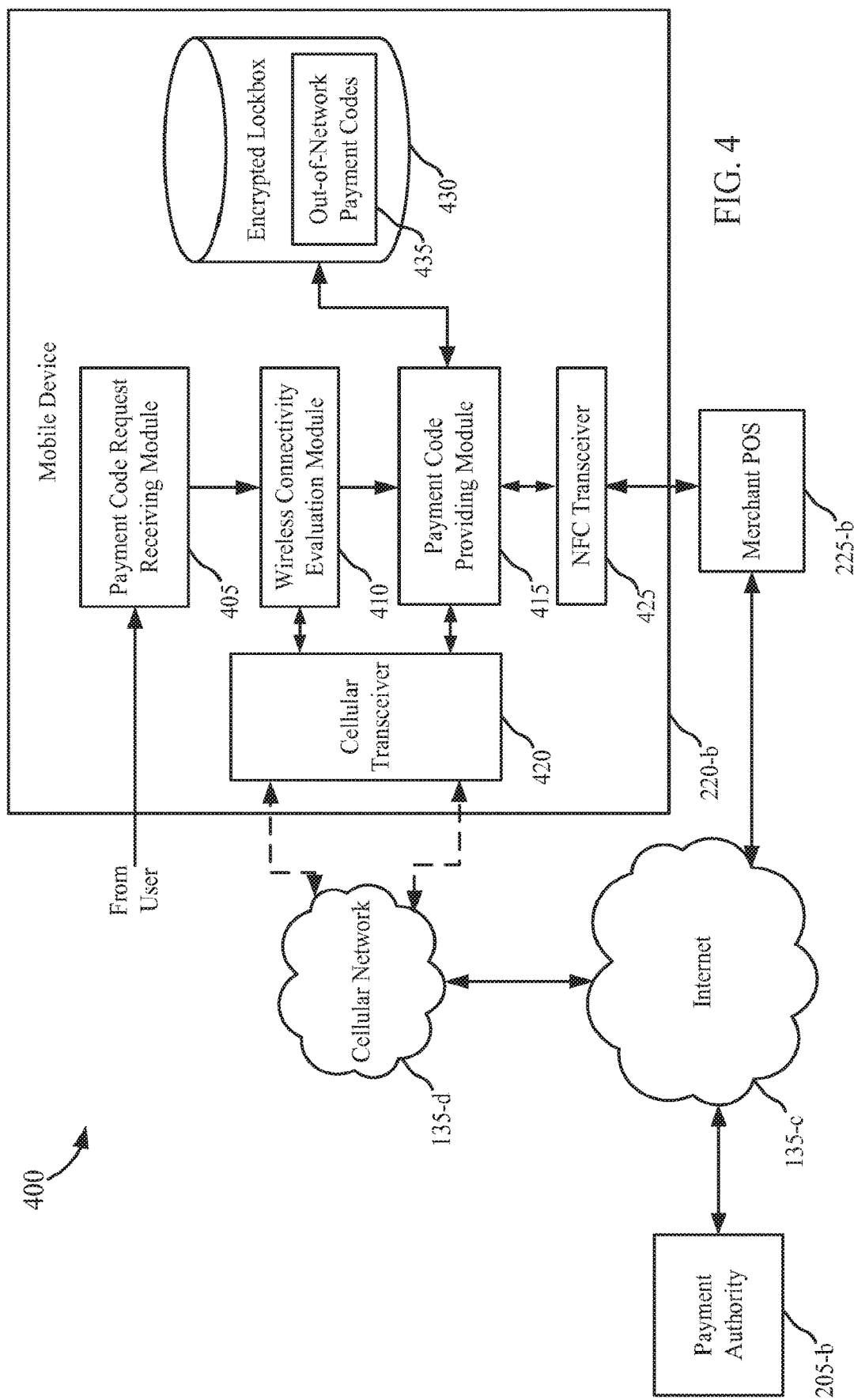
FIG. 4 is a diagram of an example system including components configured according to various embodiments of the invention.

FIG. 4 is a block diagram of another example system 400 for conducting a transaction. System 400 may be an example of system 100, system 200, or system 300 described above with respect to FIG. 1, FIG. 2, or FIG. 3. System 400 includes a payment authority server system 205-*b*, the Internet 135-*c*, cellular network 135-*d*, mobile device 220-*b*, and merchant point-of-sale (POS) terminal 225-*b*. Each of these elements may be in communication, directly or indirectly. Payment authority server system 205-*b* may be an example of the payment authority 120 described above with reference to FIG. 1 or the payment authority servers 205 described above with reference to FIG. 2 or FIG. 3. The Internet 135-*c* and cellular network 135-*d* may be examples of network 135 described above with reference to FIG. 1 or FIG. 3. Mobile device 220-*b* may be an example of the mobile device 220 described above with respect to FIG. 2 or FIG. 3. Merchant POS terminal 225-*b* may be a component of the merchant POS system(s) 225 described above with reference to FIG. 2 and/or an example of merchant POS terminal 225-*a* described above with reference to FIG. 3.

In the present example, mobile device 220-*b* includes payment code request receiving module 405, wireless connectivity evaluation module 410, payment code providing module 415, cellular transceiver 420, NFC transceiver 425, and encrypted lockbox data store 430, which stores out-of-network payment codes 435. Each of these components may be in communication, directly or indirectly.

As described in the above examples, mobile device 220-*b* may communicate with payment authority 205-*b* over cellular network 135-*d* and the Internet 135-*c* to receive perishable payment codes to authorize transactions with merchants. To conduct a transaction, the user may first request a payment code at payment code request receiving module 405. Wireless connectivity evaluation module 410 may communicate with cellular transceiver 420 to determine whether mobile device 220-*b* is connected to cellular network 135-*d*.

When mobile device 220-*b* is in communication with cellular network 135-*d*, payment code providing module 415 may request and receive a dynamically generated perishable payment code from payment authority 205-*b* in real-time by way of the Internet 135-*c*, cellular network 135-*d*, and cellular transceiver 420. Payment code providing module 415 may then provide the received payment code to merchant POS terminal 225-*b* for processing over NFC transceiver 425 or another type of transceiver (e.g., Bluetooth, Wi-Fi, etc.). However, if mobile device 220-*b* is disconnected from cellular network 135-*d* payment code providing module which decrypts the lockbox data store 430, retrieves one of the out-of-network payment codes 435 previously provided by payment authority 205-*b* and transmits the out-of-network payment code to merchant POS 225-*b* over NFC transceiver 425 for processing and approval. The out-of-network payment code may then be marked as used or invalid, and discarded immediately or at a future time. In certain embodiments, instead of using transceiver 425 to provide the payment code to merchant POS terminal 225-*b*, mobile device 220-*b* may display the payment code to the user and/or the merchant, and the user and/or the merchant may provide the payment code to merchant POS terminal 225-*b*.

In certain examples, mobile device 220-*b* may be configured to adjust a period of validity for one or more of the out-of-network codes 435 stored by encrypted lockbox data store 430 according to a location of mobile device 220-*b* or another criterion. Additionally or alternatively, one or more of the out-of-network payment codes 435 stored by encrypted lockbox data store 430 may be valid for a fixed or indefinite amount of time.

In examples where the payment code includes a first component provided by payment authority 205-*b* and a second component known by the user of mobile device 220-*b*, mobile device 220-*b* may prompt the user to enter the second component in order for the payment code to be provided to merchant POS terminal 225-*b*.

Once connectivity with cellular network 135-*d* is regained, mobile device 220-*b* may communicate with payment authority 205-*b* to receive replacement out-of-network payment codes for used or expired out-of-network payment codes 435 stored by encrypted lockbox data store 430.

Figure 5:
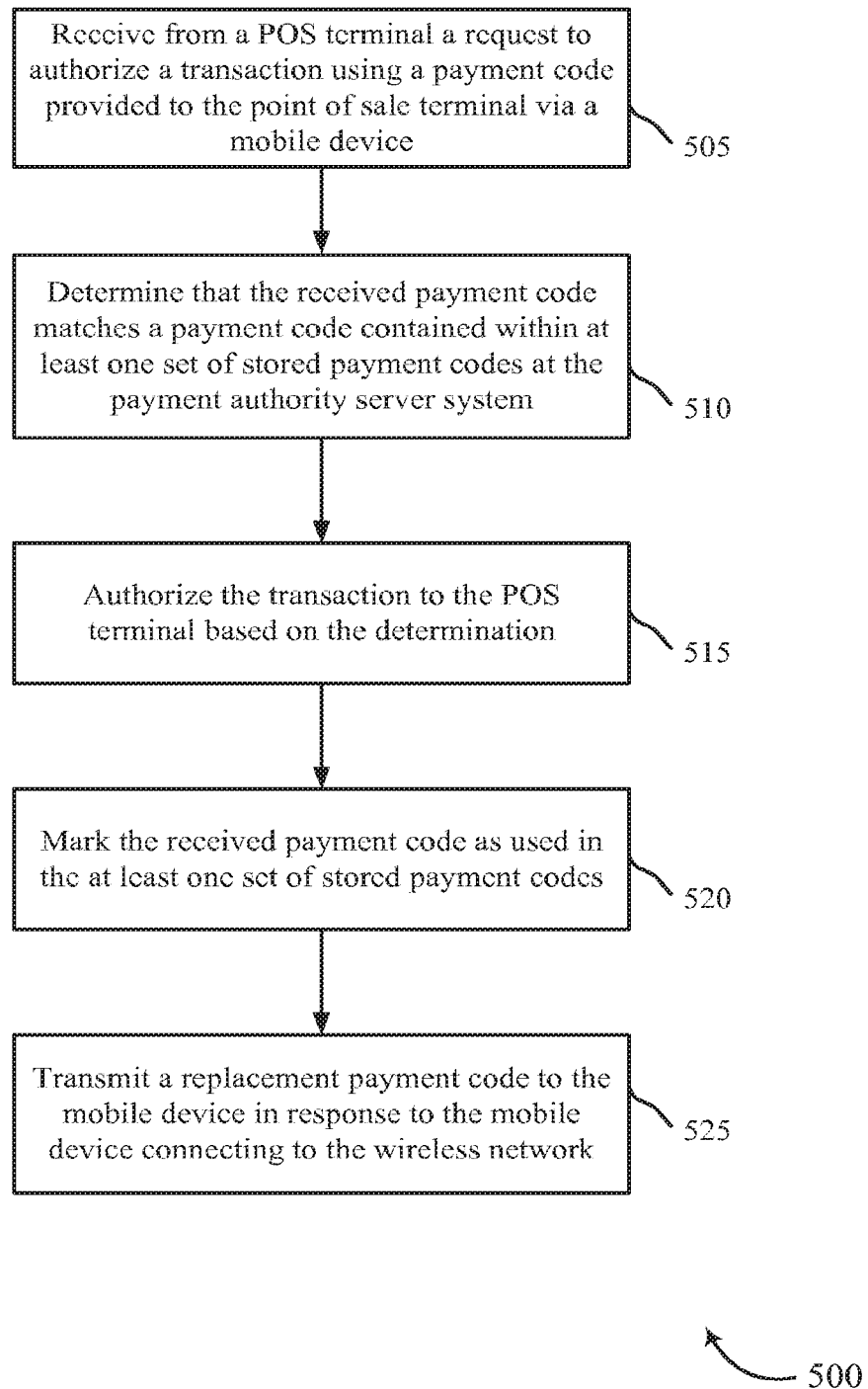
FIG. 5 is a flowchart diagram of an example method of conducting a transaction from the perspective of a payment authority, according to various embodiments of the invention.

FIG. 5 is a flowchart diagram of an example method 500 of conducting a transaction. The method 500 may be performed, for example, by payment authority 120 of FIG. 1 or payment authority 205 of FIGS. 2-4. At block 505, a request to authorize a transaction is received from a point of sale terminal using a payment code provided to the point of sale terminal via a mobile device. The received payment code is associated with a state of disconnection between the mobile device and a wireless network. At block 510, it is determined that the received payment code matches a payment code contained within at least one set of stored payment codes at the payment authority server system. At block 515, the transaction is authorized to the point of sale terminal based on the determination of block 510. At block 520, the received payment code is marked as used in the at least one set of stored payment codes. At block 525, a replacement payment code is transmitted to the mobile device in response to the mobile device connecting to the wireless network.

Figure 6:
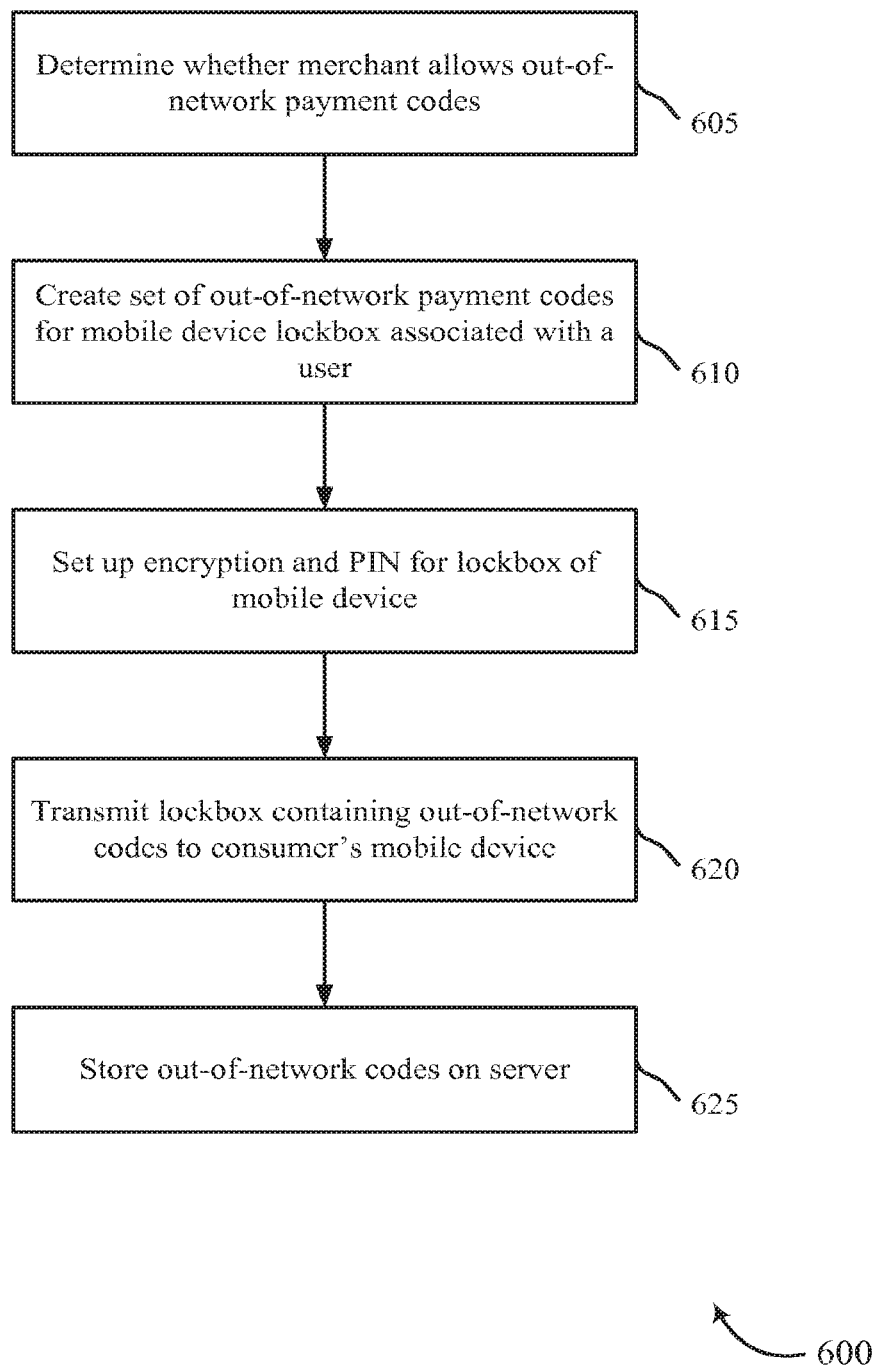
FIG. 6 is a flowchart diagram of an example method of initializing a set of out of network payment codes for a mobile device, according to various embodiments of the invention.

FIG. 6 is a flowchart diagram of an example method 600 of initializing a lockbox of out-of-network payment codes for a mobile device. The method 600 may be performed, for example, by payment authority 120 of FIG. 1 or payment authority 205 of FIGS. 2-4.

At block 605, the payment authority determines whether a particular merchant allows the use of out-of-network payment codes at the merchant's business. For the purposes of this discussion, the financial transaction is described as a purchase of goods or services. However, one of skill in the art will recognize that the method of the invention can be adapted to any financial transaction. If the merchant allows the use of out-of-network payment codes, the payment authority creates a set of out-of-network payment codes for a mobile device lockbox associated with a user at block 610.

A set of payment codes may consist of one or more individual tokens; each token can be a randomly generated series of numbers provided by the payment authority. In addition, the token can include certain digits generated by the payment authority and certain digits known or selected by the mobile device user. The length of the token is determined by the overall number of payment codes activated by the payment card management platform. For the ease of identification and to ensure quick processing, the tokens that make up the out-of-network payment codes may be a defined length that is different from the defined length of real time payment codes. By way of example only, payment codes that are activated on a real time basis through communication with a wireless network may have a length of 5 digits. In order to readily distinguish the out-of-network payment codes, the out-of-network tokens may have a length of 9 digits.

Once the set of out-of-network payment codes is created at block 610, the payment authority sets up encryption and a PIN or other access credentials for the lockbox at block 615. The payment authority then transmits the lockbox to the mobile device at block 620 and stores a matching set of out-of-network payment codes at the payment authority at block 625. For ease of organization, the payment card management platform can organize the out-of-network payment codes stored on the platform by merchant, or other category that makes matching payment codes received from merchants with stored payment codes.

Figure 7:
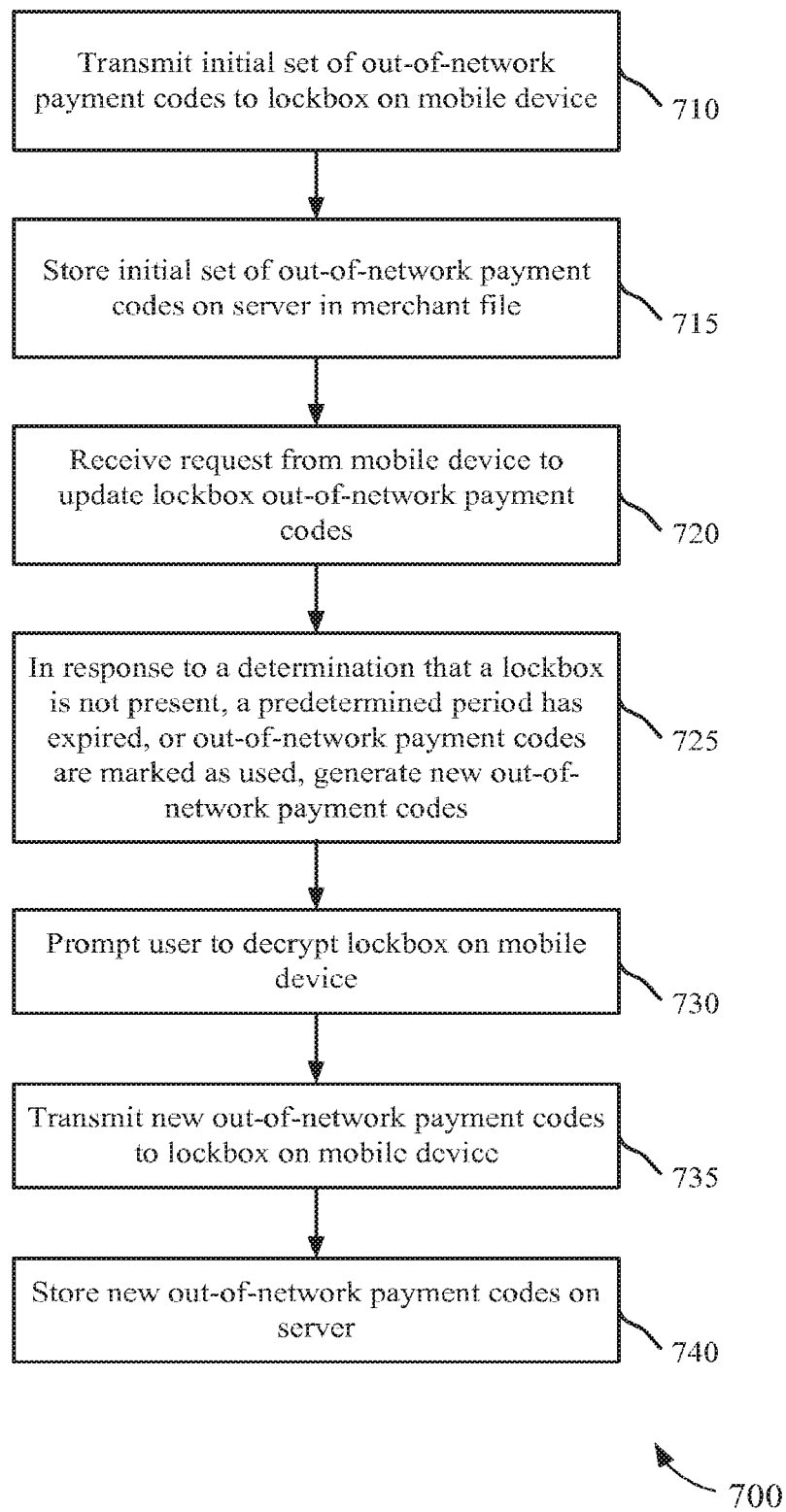
FIG. 7 is a flowchart diagram of an example method of providing a set of out of network payment codes to a mobile device, according to various embodiments of the invention.

FIG. 7 is a flowchart diagram of an example method 700 of updating a set of out-of-network payment codes according to the principles of the present disclosure. The method 700 may be performed, for example, by payment authority 120 of FIG. 1 or payment authority 205 of FIGS. 2-4.

At 710, an initial set of out-of-network payment codes is transmitted a mobile device for storage in an encrypted lockbox. At block 715, the initial set of out-of-network payment codes is stored on a server of the payment authority in a file associated with a specific merchant. At block 720, a request is received from a mobile device to update the out-of-network payment codes stored at the lockbox of the mobile device. At block 725, new out-of-network payment codes are generated if a lockbox is not present, if a predetermined expiration period for one or more stored out-of-network payment codes has expired, or if one or more stored out-of-network payment codes have been used. At block 730, a user of the mobile device is prompted to decrypt the lockbox on the mobile device (e.g., by entering a decryption PIN or other credential). At block 735, the new out-of-network payment codes are transmitted to the lockbox of the mobile device. At block 740, the new out-of-network payment codes are stored on the server of the payment authority.

Figure 8:
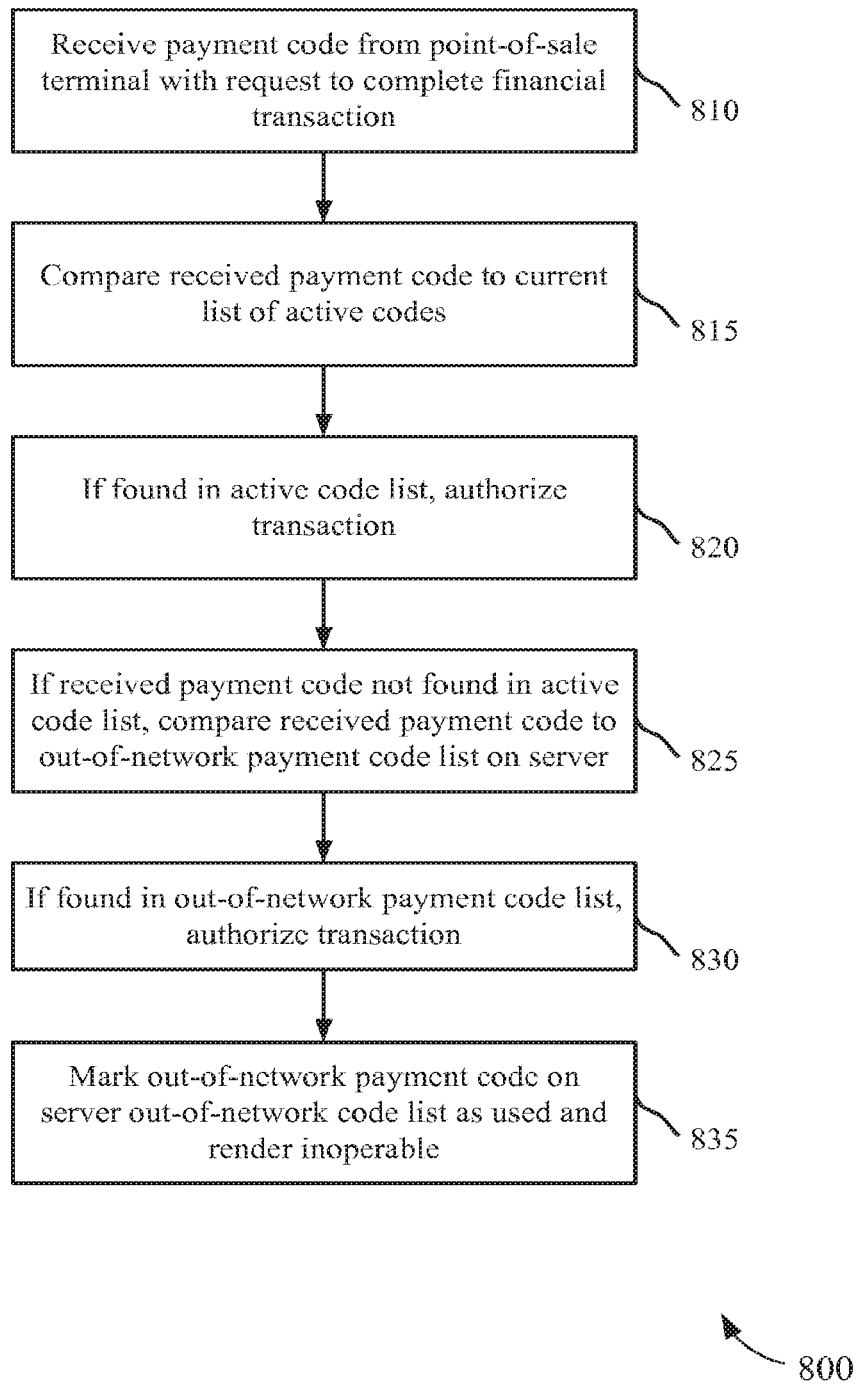
FIG. 8 is a flowchart diagram of an example method of conducting a transaction from the perspective of a payment authority, according to various embodiments of the invention.

FIG. 8 is a flowchart diagram of an example method 800 of conducting a transaction according to the principles of the present disclosure. The method 800 may be performed, for example, by payment authority 120 of FIG. 1 or payment authority 205 of FIGS. 2-4. At block 810, a payment code is received from a point-of-sale terminal with a request to complete a financial transaction. At block 815, the received payment code is compared to a current list of active real-time payment codes. If the received payment code is found in the list of active real-time payment codes, the transaction is authorized at block 820. If the received payment code is not found in the list of active real-time codes, the received payment code is compared to a list of out-of-network payment codes stored by a server of the payment authority at block 825. If the received payment code is found in the out-of-network payment code list, the transaction is authorized at block 830, and the out-of-network payment code is marked on the as used and rendered inoperable at block 835.

Figure 9:
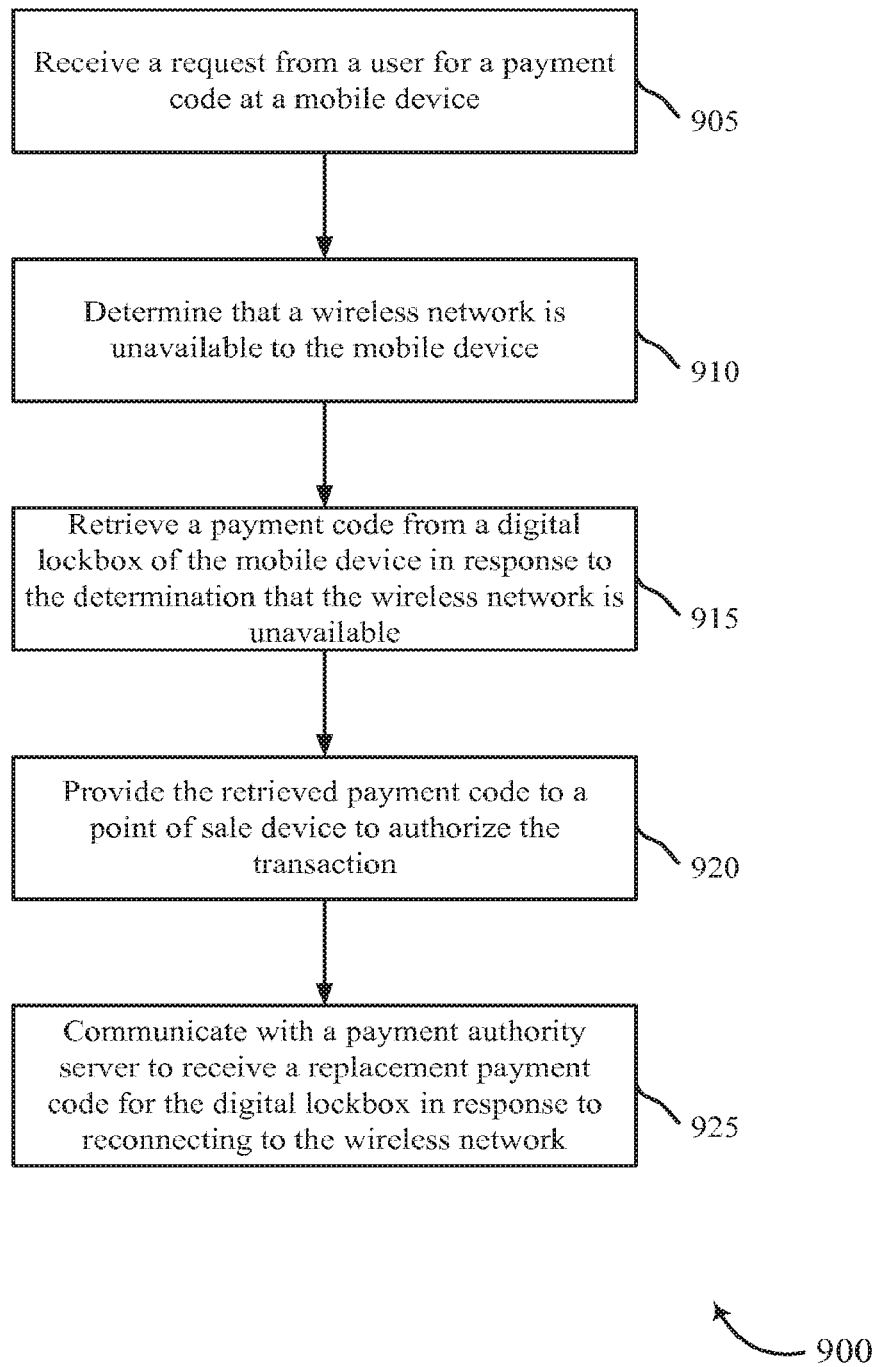
FIG. 9 is a flowchart diagram of an example method of conducting a transaction from the perspective of a mobile device, according to various embodiments of the invention.

FIG. 9 is a flowchart diagram of an example method 900 of conducting a transaction according to the principles of the present disclosure. The method 900 may be performed, for example, by mobile device 225 of FIGS. 2-4.

At block 905, a request is received from a user for a payment code at a mobile device. At block 910, a determination is made that a wireless network is unavailable to the mobile device. At block 915, a payment code is retrieved from a digital lockbox of the mobile device in response to the determination that the wireless network is unavailable. The payment code is associated with a state of disconnection between the mobile device and the wireless network. At block 920, the retrieved payment code is provided to a point of sale terminal to authorize the transaction. At block 925, the mobile device communicates with a payment authority server to receive a replacement payment code for the digital lockbox in response to the mobile device reconnecting to the wireless network.

Figure 10:
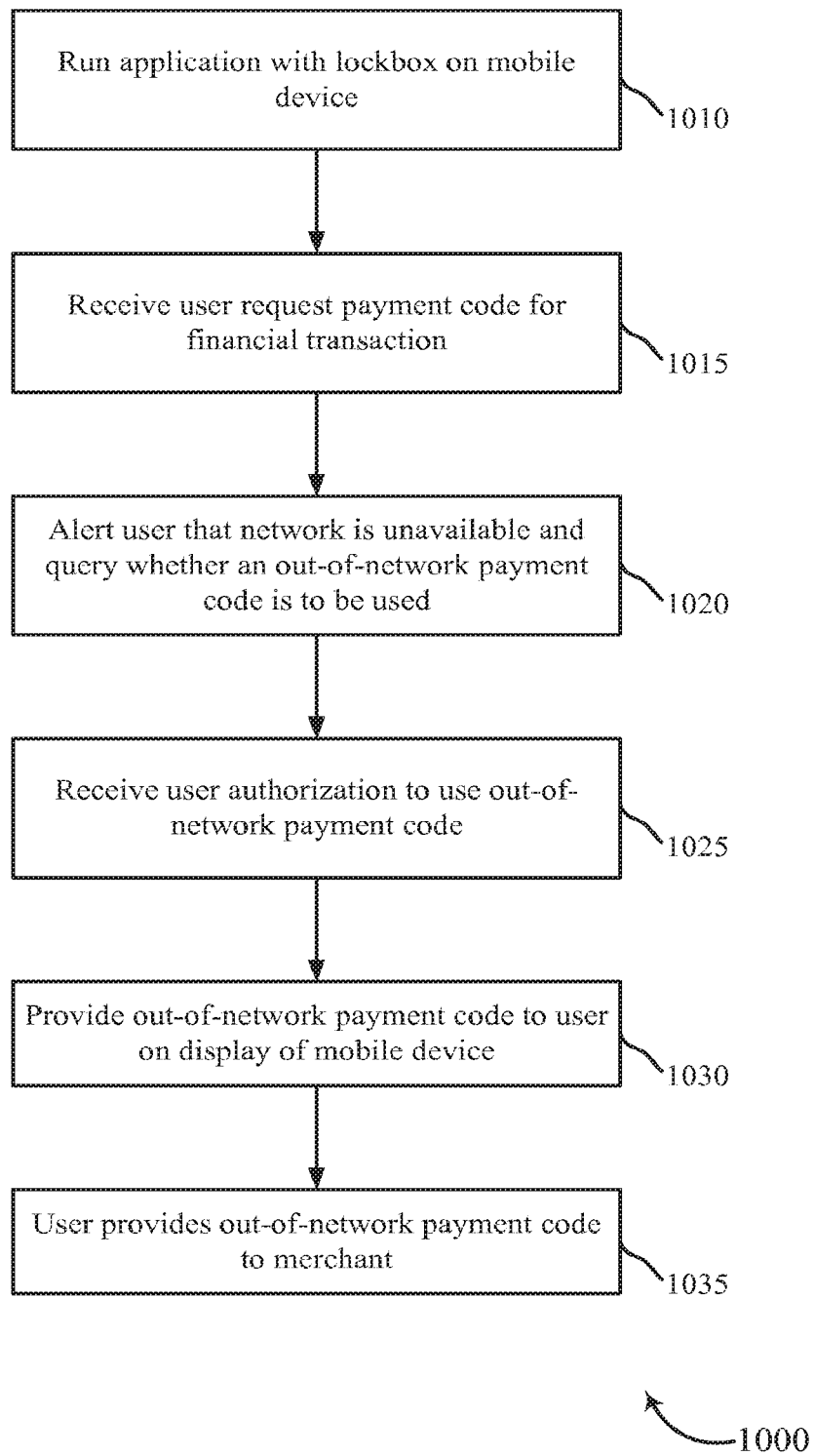
FIG. 10 is a flowchart diagram of an example method of conducting a transaction from the perspective of a mobile device, according to various embodiments of the invention.

FIG. 10 is a flowchart diagram of an example method 1000 of conducting a transaction according to the principles of the present disclosure. The method 1000 may be performed, for example, by mobile device 225 of FIGS. 2-4.

At block 1010, an application with an encrypted lockbox is run on a mobile device. At block 1015, a user request for a payment code for a financial transaction is received. At block 1020, the user is alerted that a network is unavailable and queried as to whether an out-of-network payment code is to be used. At block 1025, user authorization to use an out-of-network payment code is received. At block 1030, the out-of-network payment code is provided to the user on the display of the mobile device. At block 1035, the user provides the out-of-network payment code to a merchant for authorization of the transaction.

Figure 11:
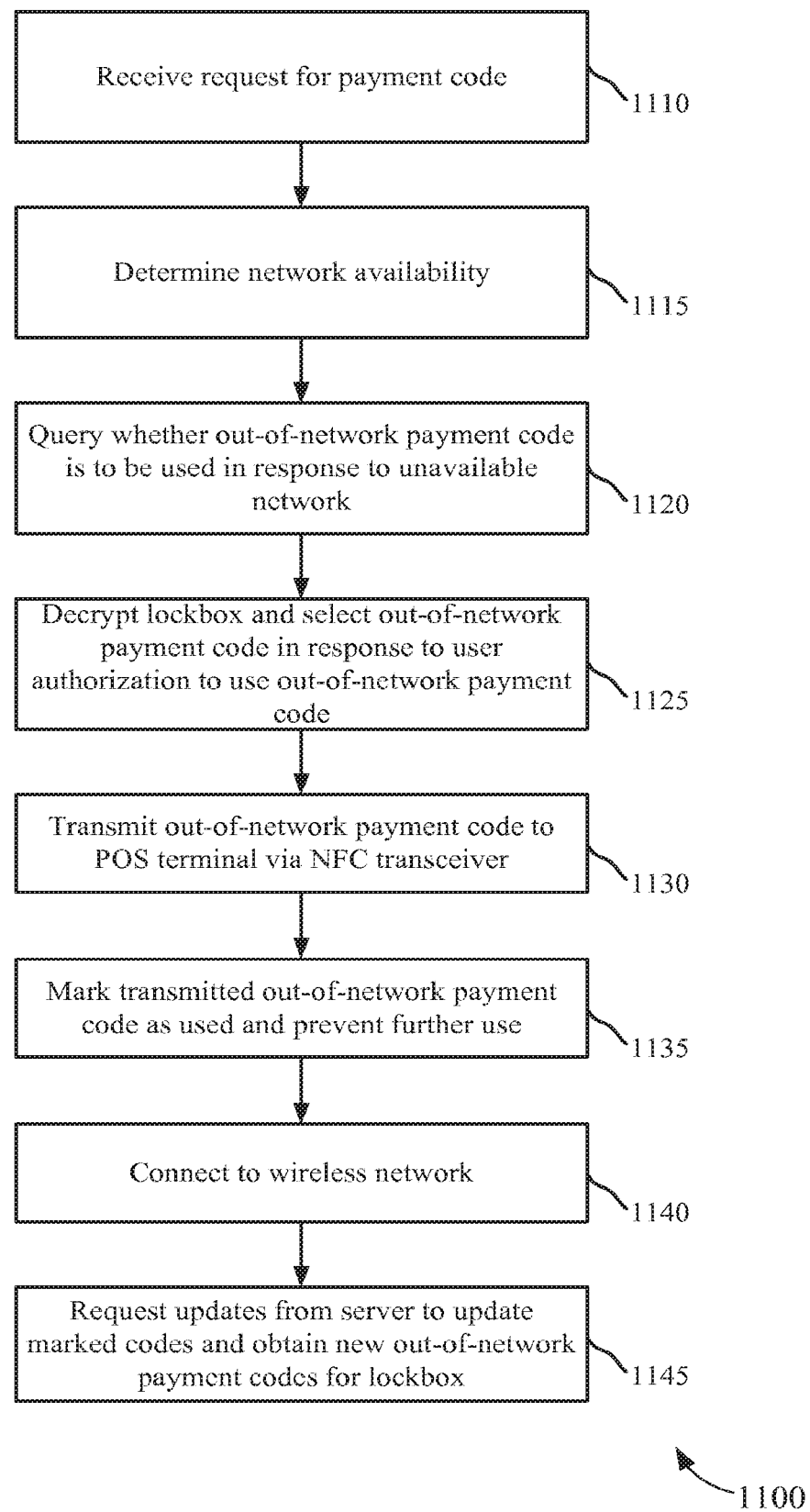
FIG. 11 is a flowchart diagram of an example method of conducting a transaction from the perspective of a mobile device, according to various embodiments of the invention.

FIG. 11 is a flowchart diagram of an example method 1100 of conducting a transaction according to the principles of the present disclosure. The method 1100 may be performed, for example, by mobile device 225 of FIGS. 2-4.

At block 1110, a request for a payment code is received from a user. At block 1115, an availability of a network (e.g., a cellular network) is determined At block 1120, the user is queried as to whether an out-of-network payment code is to be used in response to the unavailability of the network. At block 1125, a digital lockbox of the mobile device is decrypted, and an out-of-network payment code is selected in response to the user authorizing use of the out-of-network payment code. At block 1130, the out-of-network payment code is transmitted to a merchant point of sale terminal via an NFC transceiver to authorize the transaction. At block 1135, the out-of-network payment code is marked as used, and further use of that code is prevented. At block 1140, the mobile device connects to a wireless network. At block 1145, updates are requested from a payment authority server to inform the payment authority server of used out-of-network payment codes and replace used or expired out-of-network payment codes in the lockbox with newly generated out-of-network payment codes.

Figure 12:
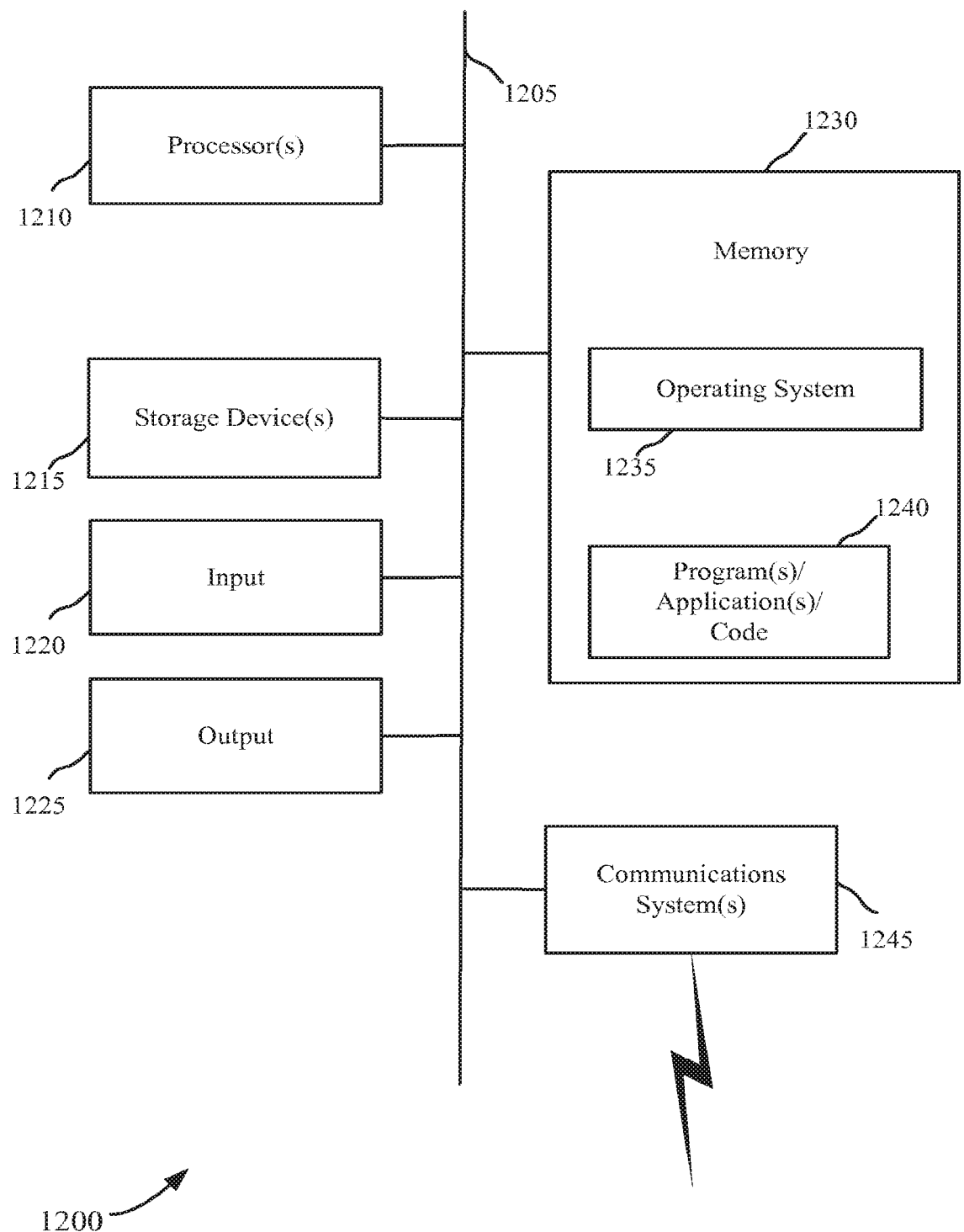
FIG. 12 is a schematic diagram that illustrates a representative device structure that may be used in various embodiments of the present invention.

A device structure 1200 that may be used for one or more components of payment authority 120 or 205, mobile device 220, merchant POS terminal 225, or for other computing devices described herein, is illustrated with the schematic diagram of FIG. 12. This drawing broadly illustrates how individual system elements of each of the aforementioned devices may be implemented, whether in a separated or more integrated manner. Thus, any or all of the various components of one of the aforementioned devices may be combined in a single unit or separately maintained and can further be distributed in multiple groupings or physical units or across multiple locations. The example structure shown is made up of hardware elements that are electrically coupled via bus 1205, including processor(s) 1210 (which may further comprise a DSP or special-purpose processor), storage device(s) 1215, input device(s) 1220, and output device (s) 1225. The storage device(s) 1215 may be a machine-readable storage media reader connected to any machine-readable storage medium, the combination comprehensively representing remote, local, fixed, or removable storage devices or storage media for temporarily or more permanently containing computer-readable information. The communications system(s) interface 1245 may interface to a wired, wireless, or other type of interfacing connection that permits data to be exchanged with other devices. The communications system(s) interface 1245 may permit data to be exchanged with a network.

The structure 1200 may also include additional software elements, shown as being currently located within working memory 1230, including an operating system 1235 and other code 1240, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

Figure 13:
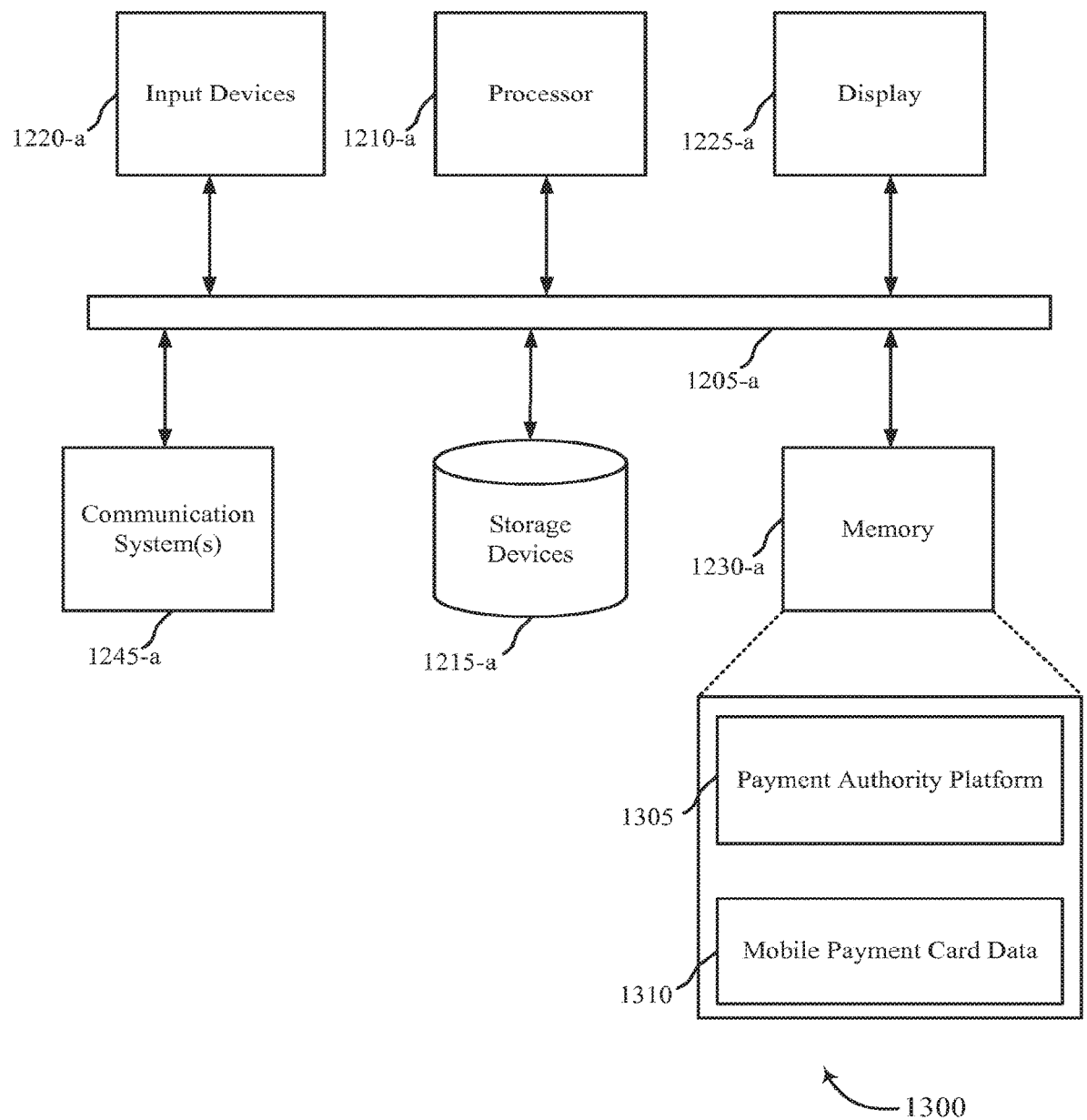
FIG. 13 is a schematic diagram that illustrates a representative payment authority server system that may be used in various embodiments of the present invention.

FIG. 13 is a functional block diagram of a computer server ("server") 1300 that distributes and manages mobile payment cards in accordance with an illustrative embodiment of the invention. The server 1300 may be an example of the device structure 1200 described above with reference to FIG. 12. In this embodiment, server 1300 may be a component of payment authority 120 or 205. In FIG. 13, processor 1210-*a* communicates over data bus 1205-*a* with input devices 1220-*a*, display 1225-*a*, communication systems 1245-*a*, storage devices 1215-*a* (e.g., hard disk drives, floppy disk drives, optical drives, flash memory, etc.), and memory 1230-*a*. Though FIG. 13 shows only a single processor, multiple processors or a multi-core processor may be present in some embodiments.

Input devices 1220-*a* include, for example, a keyboard, a mouse or other pointing device, or other devices that are used to input data or commands to server 1300 to control its operation. Communication systems 1245-*a* may include, for example, various serial or parallel interfaces for communicating with a network 135 (see FIG. 1) or one or more peripherals.

Memory 1230-*a* may include, without limitation, random access memory (RAM), read-only memory (ROM), flash memory, magnetic storage (e.g., a hard disk drive), processors, optical storage, or a combination of these, depending on the particular embodiment. In FIG. 13, memory 1230-*a* includes payment authority platform 1305, which distributes and manages mobile payment cards and out of network payment codes. In doing so, payment authority platform 1305 accesses and manipulates mobile payment card data 1310, which may reside, at least in part, on storage devices 1215-*a*. In certain examples, memory 1230-*a* may be implemented by one or more peripheral or network devices in communication with server 1300.

As mentioned above, payment authority platform 1305 implements a server-side digital wallet for the mobile payment card data. A "mobile payment card" is, thus, a digital construct (stored digital data) that replaces a physical (e.g., plastic, magnetically encoded) payment card. In this illustrative embodiment, server 1300 stores account information for each mobile-payment-card holder. That is, each mobile payment card user initially creates an account on server 1300. This account information includes, for each mobile payment card belonging to a particular user, (1) the user's mobile phone number, (2) the account number of the particular mobile payment card (analogous to a card number of a physical payment card), (3) the merchant that issued the mobile payment card, and (4) a server-side lockbox that houses a number of out-of-network payment codes. In some embodiments, server 1300 stores additional information or different information from that just indicated. Note, however, that, in this particular embodiment, the balance remaining on the payment card is not stored on server 1300. Instead, the balance is tracked by the payment-card service provider that operates the applicable payment card system. As mentioned above, no credentials associated with a payment card reside on the user's mobile device.

In one illustrative embodiment, payment authority platform 1305 is implemented as software that is executed by processor 1210-*a*. Such software may be stored, prior to its being loaded into RAM for execution by processor 1210-*a*, on any suitable computer-readable storage medium such as a hard disk drive, an optical disk, or a flash memory. In general, the functionality of payment authority platform 1305 may be implemented as software, firmware, hardware, or any combination or sub-combination thereof. The methods carried out by payment authority platform 340 are explained more fully above.

The components described in the Figures of the present disclosure may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A method for authorizing, at a payment authority server, a transaction between a mobile device and a merchant server, the method comprising:
   executing an application on the payment authority server;
   generating by the payment authority server a payment code using the application for use by the mobile device when the mobile device is located in areas associated with a risk of disconnection of the mobile device from the network;
   transmitting, using wireless communication functionality responsive to a request from the application executing on the payment authority server, the payment code to the mobile device via the wireless network, wherein the payment code is stored in an encrypted storage on the mobile device and for use by the mobile device when the mobile device cannot establish communication with the payment authority server via the wireless network;
   updating by the payment authority server the payment code using the application in response to detection of when the mobile device is located in an area associated with a risk of disconnection of the mobile device from the network;
   receiving by the payment authority server the payment code from the merchant server, the merchant server receiving the payment code from the mobile device after user entry of a decryption credential enables the mobile device to decrypt one or more payment codes including the payment code within encrypted storage on the mobile device, and wherein the payment code is transmitted from the mobile device to the merchant server for a transaction in response to selection of the payment code from the decrypted one or more payment codes by the mobile device in response to a user authorization of use of an out-of-network payment code, the selected payment code associated with a state of disconnection between the mobile device and the wireless network;
   validating by the payment authority server the payment code to authorize the transaction between the mobile device and the merchant server; and
   transmitting by the payment authority server a replacement payment code to the mobile device in response to the mobile device connecting to the wireless network, wherein the replacement code is associated with a state of disconnection between the mobile device and the wireless network, and wherein access to the encrypted storage on the mobile device enables the encrypted storage to be decrypted by the mobile device in response to user entry of the decryption credential and the payment code to be replaced by the replacement payment code.

2. The method of claim 1, further comprising:
   receiving by the payment authority server a request from an application on the mobile device for the payment code.

3. The method of claim 1, wherein the payment code is perishable and includes a period of validity.

4. The method of claim 3, wherein the period of validity is adjustable.

5. The method of claim 1, wherein the payment code is a one-use payment code.

6. The method of claim 1, further comprising:
   invalidating by the payment authority server the received payment code for future transactions.

7. A payment authority server to authorize a transaction between a mobile device and a merchant server, the payment authorization server comprising:
   at least one processor; and
   at least one memory communicatively coupled with the at least one processor, the at least one memory comprising executable code that, when executed by the at least one processor, causes the at least one processor of the payment authority server to perform operations comprising:
      executing an application;
      generating a payment code using the application or use by the mobile device when the mobile device is located in areas associated with a risk of disconnection of the mobile device from the network;
      transmitting, using wireless communication functionality responsive to a request from the application executing, the payment code to the mobile device via the wireless network, wherein the payment code is stored in an encrypted storage on the mobile device and for use by the mobile device when the mobile device cannot establish communication with the payment authority server via the wireless network;
      updating by the payment authority server the payment code using the application in response to detection of when the mobile device is located in an area associated with a risk of disconnection of the mobile device from the network;
      receiving the payment code from the merchant server, the merchant server receiving the payment code from the mobile device after user entry of a decryption credential enables the mobile device to decrypt one or more payment codes including the payment code within encrypted storage on the mobile device, and wherein the payment code is transmitted from the mobile device to the merchant server for a transaction in response to selection of the payment code from the decrypted one or more payment codes by the mobile device in response to a user authorization of use of an out-of-network payment code, the selected payment code associated with a state of disconnection between the mobile device and the wireless network;
      validating the payment code to authorize the transaction between the mobile device and the merchant server; and
      transmitting a replacement payment code to the mobile device in response to the mobile device connecting to the wireless network, wherein the replacement code is associated with a state of disconnection between the mobile device and the wireless network, and wherein access to the encrypted storage on the mobile device enables the encrypted storage to be decrypted by the mobile device in response to user entry of the decryption credential and the payment code to be replaced by the replacement payment code.

8. The server of claim 7, wherein the executable code further causes the at least one processor to:
   receive a request from an application on the mobile device for the payment code.

9. The server of claim 7, wherein the payment code is perishable and includes a period of validity.

10. The server of claim 9, wherein the period of validity is adjustable.

11. The server of claim 7, wherein the payment code is a one-use payment code.

12. The server of claim 7, wherein the executable code further causes the at least one processor to:

invalidate the received payment code for future transactions.

* * * * *